(12) United States Patent
Podgurski

(10) Patent No.: US 8,784,057 B2
(45) Date of Patent: Jul. 22, 2014

(54) DISC ROTOR RETRACTION SYSTEM

(75) Inventor: Daniel M. Podgurski, West Chester, PA (US)

(73) Assignee: The Boeing Company, Chicago, IL (US)

( * ) Notice: Subject to any disclaimer, the term of this patent is extended or adjusted under 35 U.S.C. 154(b) by 815 days.

(21) Appl. No.: 13/037,205

(22) Filed: Feb. 28, 2011

(65) Prior Publication Data

US 2012/0219417 A1 Aug. 30, 2012

(51) Int. Cl.
*B64C 11/28* (2006.01)
*B64C 11/38* (2006.01)

(52) U.S. Cl.
USPC .............. 416/142; 416/134 A; 416/1; 416/87; 416/154

(58) Field of Classification Search
CPC ...... B64C 27/026; B64C 27/10; B64C 27/30; B64C 27/467; B64C 27/473
USPC ............ 416/99, 131, 132 R, 134 A, 138, 141, 416/140, 142, 143, 87, 88, 89, 104, 153, 416/154
See application file for complete search history.

(56) References Cited

U.S. PATENT DOCUMENTS

| | | | |
|---|---|---|---|
| 1,922,866 A * | 8/1933 | Rosenberg et al. | 416/88 |
| 3,249,160 A * | 5/1966 | Messerschmitt | 416/174 |
| 4,142,697 A | 3/1979 | Fradenburgh | |
| 5,735,670 A | 4/1998 | Moffitt et al. | |
| 6,972,498 B2 * | 12/2005 | Jamieson et al. | 290/55 |
| 2003/0223868 A1 * | 12/2003 | Dawson et al. | 416/1 |
| 2009/0175725 A1 | 7/2009 | Podgurski et al. | |
| 2010/0150717 A1 * | 6/2010 | Turmanidze et al. | 416/87 |
| 2011/0206513 A1 * | 8/2011 | Walker et al. | 416/88 |

OTHER PUBLICATIONS

Segel, R.M., Fradenburgh, E.A., Development of TRAC Variable Rotor Concept, AIAA paper 1969-221.
Fenny, C.A., Mechanism for Varying the Diameter of Rotors Using Compound Differential Rotary Transmission, American Helicopter Society 61st annual forum—Jun. 1-3, 2005.
Turmanidze, R.S., Khutsisvhvili, S. N., Dadone, L.,Design and Experimental Investigation of Variable-Geometry Rotor Concepts, Adabptive Structures and Material Systems Symposium, International Mechanical Engineering Congress and Exposition, Nov. 11-16, 2001.
Tarczynski, T., Development of a Retractable Rotor, AHS paper—Oct. 9, 1956.

\* cited by examiner

*Primary Examiner* — Nathaniel Wiehe
*Assistant Examiner* — Aaron Jagoda
(74) *Attorney, Agent, or Firm* — Felix L. Fischer

(57) ABSTRACT

A disc rotor blade retraction system includes a main blade spar incorporating a hydraulic cylinder and having a screw thread. A ball screw is concentrically carried within the main blade spar and is operably connected to a ball nut which has an outboard end connected to an intermediate spar with a hydraulic piston received for reciprocation in the hydraulic cylinder. A first geared actuator engages the ball screw and a second geared actuator engages the main blade spar screw thread. A hydraulic fluid accumulator providing pressurized hydraulic fluid is connected to an outboard end of the hydraulic cylinder and a controller actuates the first and second geared actuators.

20 Claims, 16 Drawing Sheets

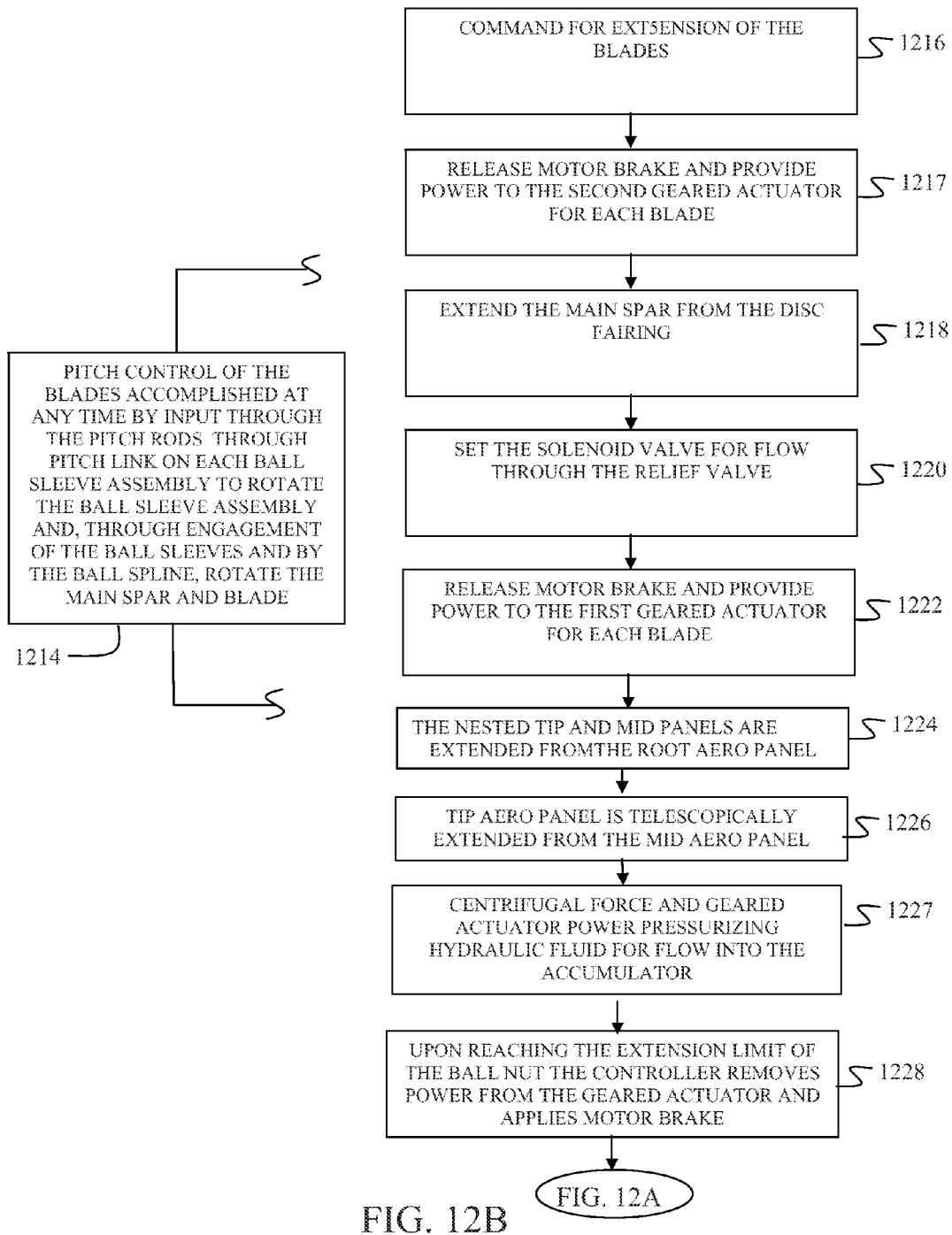

DISC ROTOR RETRACTION SYSTEM

STATEMENT REGARDING FEDERALLY SPONSORED RESEARCH OR DEVELOPMENT

This invention was made with Government support under contract number HR0011-09-C-0056 awarded by DARPA. The government has certain rights in this invention.

BACKGROUND INFORMATION

1. Field

Embodiments of the disclosure relate generally to the field of rotorcraft and more particularly to embodiments for a retractable disc rotor system employing a two stage retraction system with integrated screw and hydraulic actuation.

2. Background

Efficient operation of helicopters as vertical takeoff or landing (VTOL) aircraft is limited typically by cruise speed which cannot exceed a critical advancing and receding rotor speed. Contra-rotating rotors and other approaches have been used to reduce this requirement however systems employing fixed wing lift for cruise are desirable. Disc rotor systems which allow partial or full retraction of the rotor blades have been proposed to allow conversion to wing supported flight for cruise thereby allowing higher speeds. Existing solutions and ideas are undeveloped and use a single device such a wire cable or ball screw for retraction of rotor blades. Such prior art designs may also lack or require complex supplemental safety mechanisms designed to prevent failures. A cable mechanism requires a relatively heavy cable to support the high centrifugal loads imposed on the rotor blades. It also requires a large capstan, gear reductions and idler pulleys to achieve the high force required to retract a blade. Cables are subject to relatively high stretch under load which may make synchronizing retraction positions from one blade to another difficult. When taking the high centrifugal loads into account, a device using only a ball screw may be unreliable and short lived due to the need to make it small enough to fit inside a rotor blade. If the device powering the ball-screw should fail, the screw can be backdriven unless it has a brake large enough to counter loads from centrifugal force. Back-driving could result in an uncommanded extension of a single blade resulting in an imbalance of the rotor. A device similar to the ball-screw, a dedicated hydraulic cylinder, must also be small enough to fit inside the rotor blade. This small size requires hydraulic pressures in the range of 5,000 psi to be useful. These high pressures may be difficult to seal in a flexible assembly.

It is therefore desirable to provide a disc rotor retraction system which eliminates blade retraction synchronization issues and uncommanded extension while providing a compact arrangement which may be accommodated within the rotor blade cord.

SUMMARY

An example embodiment provides a disc rotor blade retraction system having a main blade spar incorporating a hydraulic cylinder and having a screw thread. A ball screw is concentrically carried within the main blade spar and operably carries a ball nut which has an outboard end connected to an intermediate spar with a hydraulic piston received for reciprocation in the hydraulic cylinder. A first geared actuator engages the ball screw and a second geared actuator engages the main blade spar screw thread. A hydraulic fluid accumulator providing pressurized hydraulic fluid is connected to an outboard end of the hydraulic cylinder and a controller actuates the first and second geared actuators.

A disc rotor employs the disc rotor blade retraction system for a plurality of rotor blades, each blade having a tip aero panel, a mid aero panel and a root aero panel. Each blade incorporates a main blade spar having a hydraulic cylinder and a screw thread. A ball screw is concentrically carried within the main blade spar and operably carries a ball nut which has an outboard end connected to an intermediate spar with a hydraulic piston received for reciprocation in the hydraulic cylinder. A first geared actuator engages the ball screw and a second geared actuator engages the main blade spar screw thread. A hydraulic fluid accumulator providing pressurized hydraulic fluid is connected to an outboard end of the hydraulic cylinder and a controller actuates the first and second geared actuators for each blade of the disc rotor.

Operation of the disc rotor blade retraction system embodiment is initiated by commanding retraction of a plurality of blades. For each blade a solenoid valve is set for flow through a check valve for hydraulic fluid to flow from the accumulator. Power is provided to the first geared actuator which rotates the ball screw and with the assistance of pressurized hydraulic fluid from the accumulator acting on the piston head, telescopically withdraws a tip aero panel into a mid aero panel using the intermediate spar connected to both the ball nut and the piston head. The nested tip and mid aero panels are then withdrawn into a root aero panel. Upon reaching a retraction limit of the ball nut on the ball screw, power is removed from the geared actuator and a motor brake is applied. Power is then provided to the second geared actuator for each blade which rotates a nut that engages the thread on a main blade spar carrying the root aero panel to withdraw the main blade spar into a disc fairing.

The features, functions, and advantages that have been discussed can be achieved independently in various embodiments of the present invention or may be combined, in yet other embodiments farther details of which can be seen with reference to the following description and drawings.

DETAILED DESCRIPTION

Figure 1A:
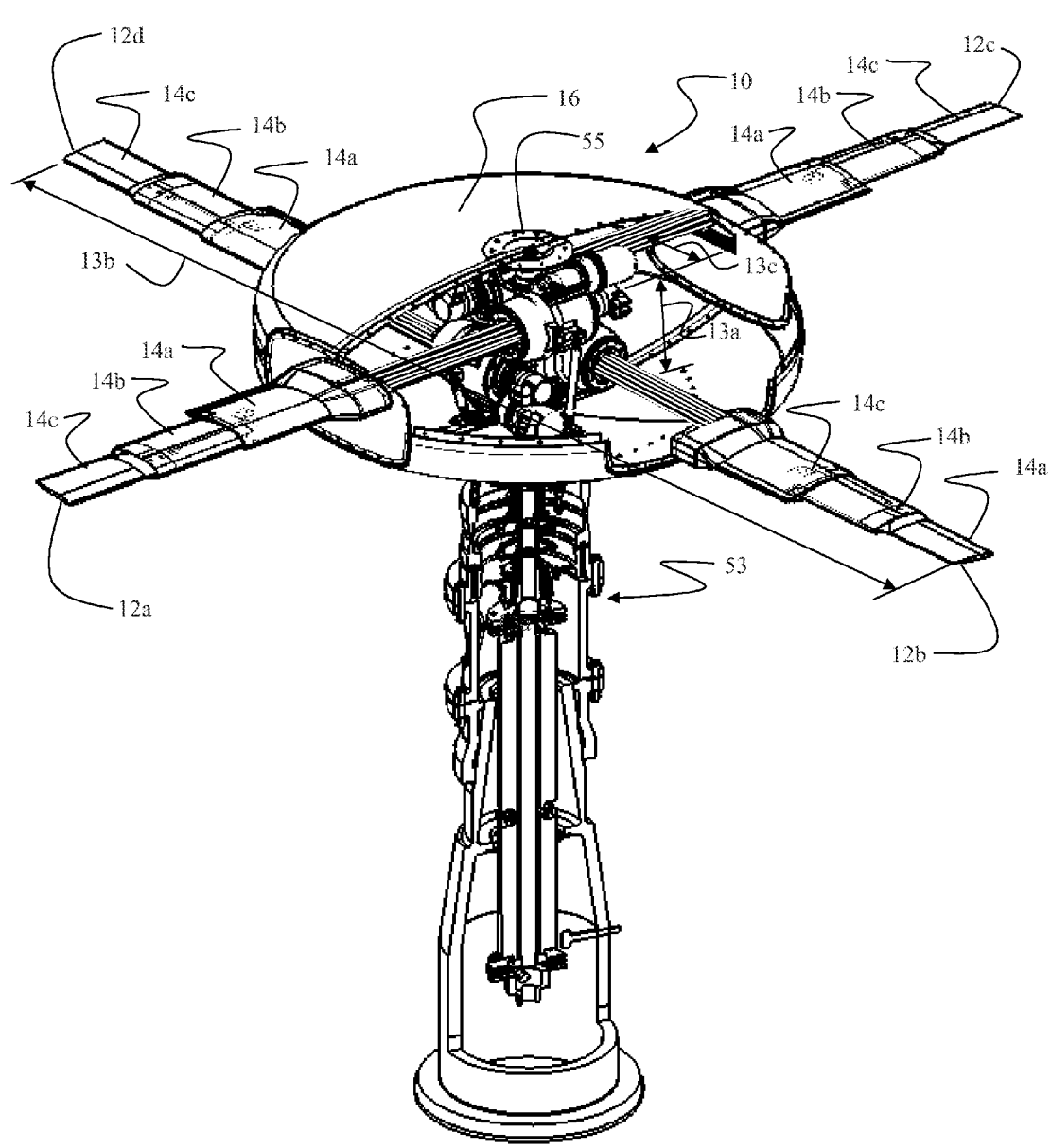
FIG. 1A is a partially sectioned isometric view of an example embodiment of the disc rotor system with rotor blades extended.
Figure 1B:
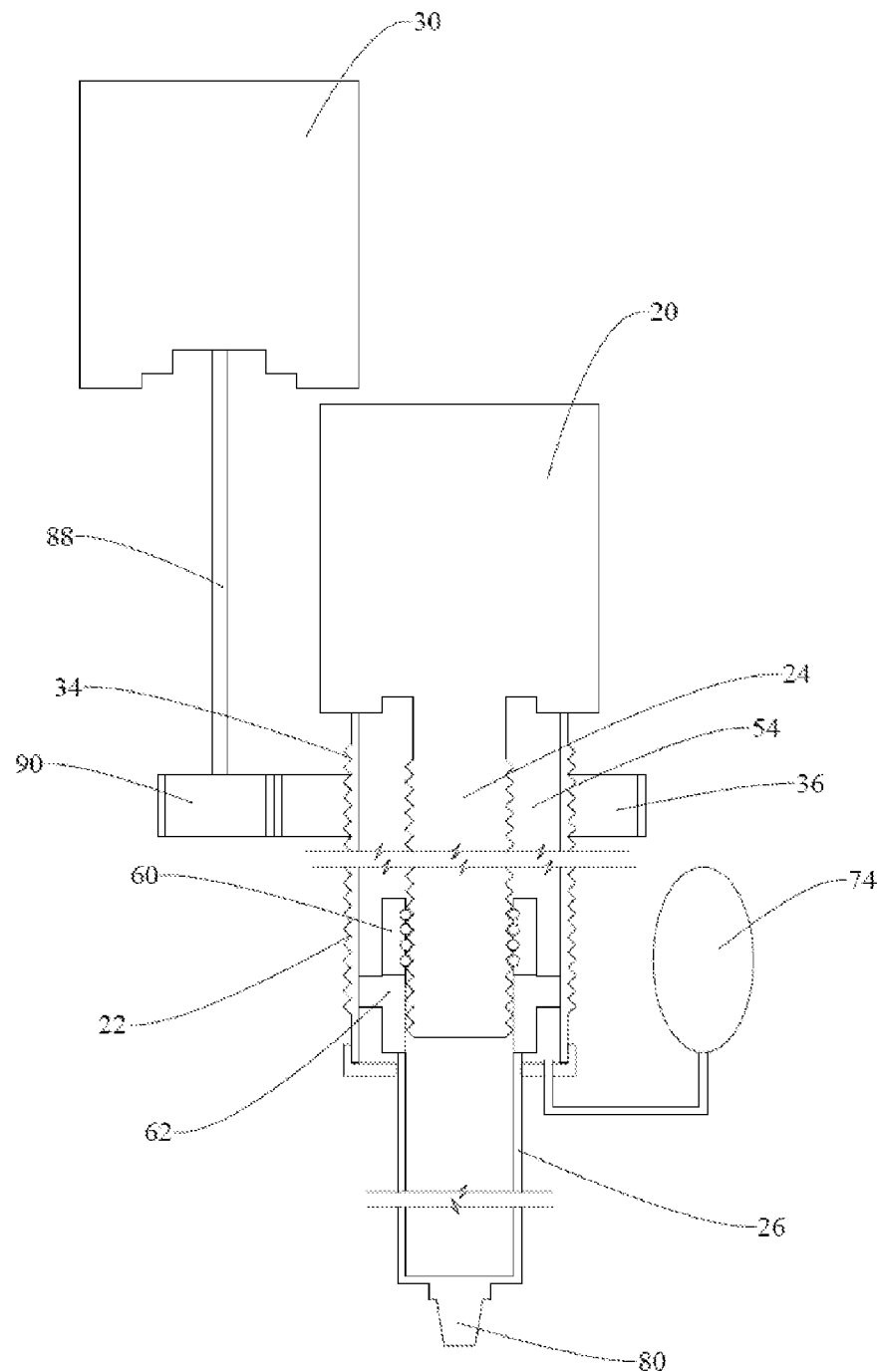
FIG. 1B is a schematic diagram of the operating elements of the two stage retraction system.

The embodiments described herein demonstrate a system as shown in FIG. 1A for a disc rotor 10 having multiple blades 12a, 12b, 12c and 12d, each rotor blade with three telescoping pieces; a root aero panel 14a, a mid aero panel 14b and an outer aero panel 14c. The blade panels are retracted into a central disc fairing 16 with a retraction mechanism, to be explained in greater detail subsequently, that retracts the rotor blade in two separate stages. For the example embodiment, the four rotor blades are mounted in opposing pairs at two different levels on the aircraft, a first pair with blades 12a and 12c above a second pair with blades 12b and 12d, vertically separated by a distance 13a (best seen in FIG. 2B) equal to about 4.5% of the rotor diameter 13b shown in FIG. 1A. The opposing blade pairs are separated horizontally by a distance 13c (best seen in FIG. 2A) equal to about 6.8% of the rotor diameter 13b for retraction clearance as will be described in greater detail subsequently. The two stage retraction system is shown schematically in FIG. 1B for one blade. A detailed mechanical embodiment is described subsequently. The first retraction stage operates with a complementary push-pull action using a geared electric actuator 20 driving a highly efficient ball screw 24 which is carried concentrically within a main blade spar 22. A ball nut 60 riding on ball screw 24 is connected to a piston head 62 integral with an inboard end of an intermediate spar 26 which telescopically receives the ball screw 24. The piston head 62 is carried in hydraulic cylinder 54 integral to the main blade spar 22. Pressurized hydraulic fluid is provided from an accumulator 74 into the hydraulic cylinder 54. Operation of the geared electric actuator 20 draws the ball nut 60 inboard within the main blade spar 22 while hydraulic pressure acting on piston head 62 complements that inboard motion. As will be described in greater detail subsequently, the tip aero panel 14c (shown in FIG. 1A) is connected to an outboard fitting 80 of the intermediate spar 26 and the mid aero panel 14b (shown in FIG. 1A) is carried by the intermediate spar. Retraction of the intermediate spar 26 into the main blade spar 22 draws the tip aero panel 14c telescopically into the mid aero panel 14b and the mid aero panel telescopically into the root aero panel 14a as will be described in greater detail subsequently.

The second retraction stage employs a second geared electric actuator 30 which rotates an ACME nut 36 engaging an ACME thread 34 on the main blade spar 22. Rotation of the ACME nut withdraws the main blade spar 22 retracting the root aero panel 14c (with the telescopically nested tip a mid aero panels) into the disc fairing 16.

Figure 2A:
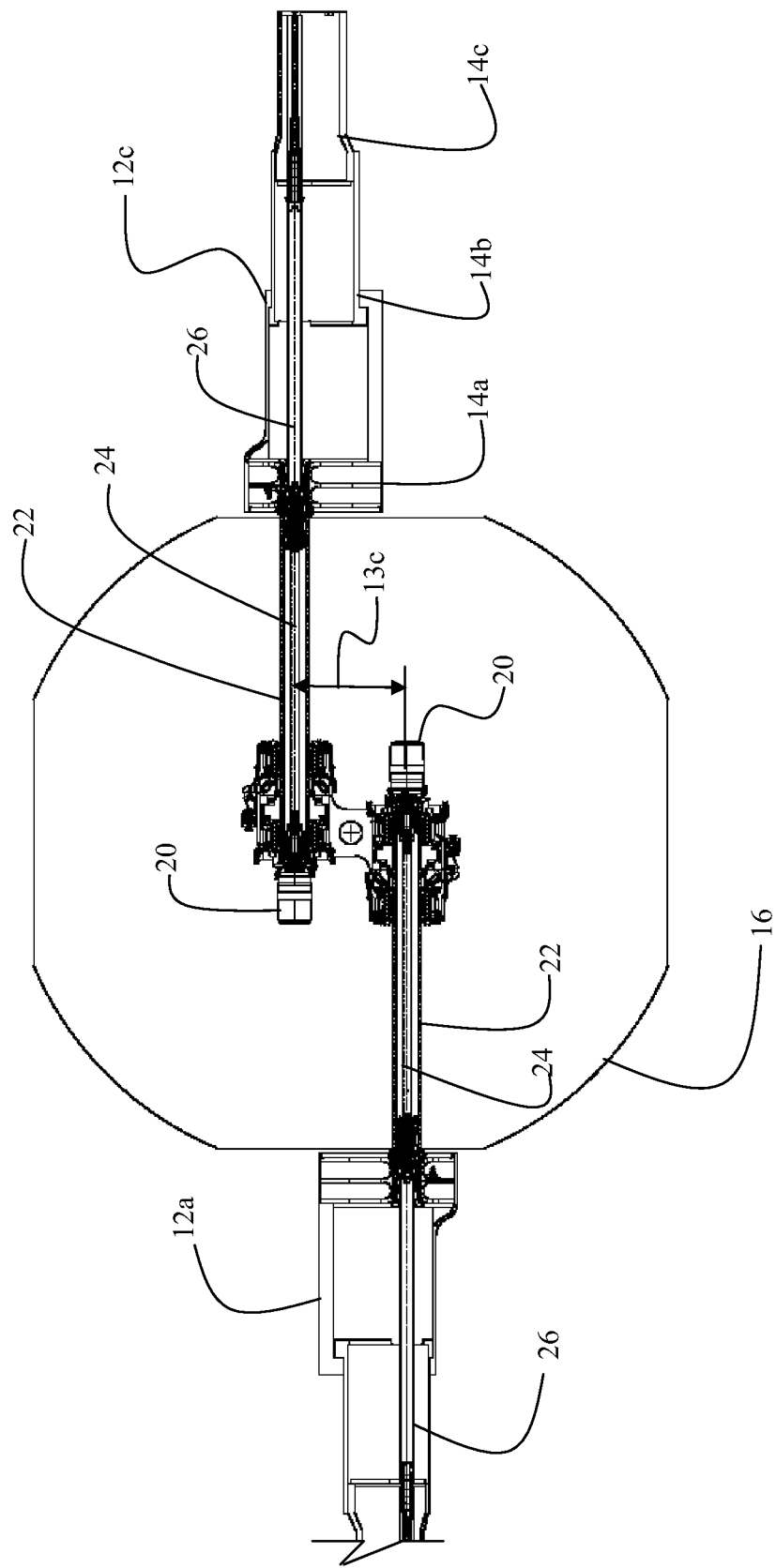
FIG. 2A is a top section view of one pair of blades in the disc rotor system showing one opposing blade pair.
Figure 2B:
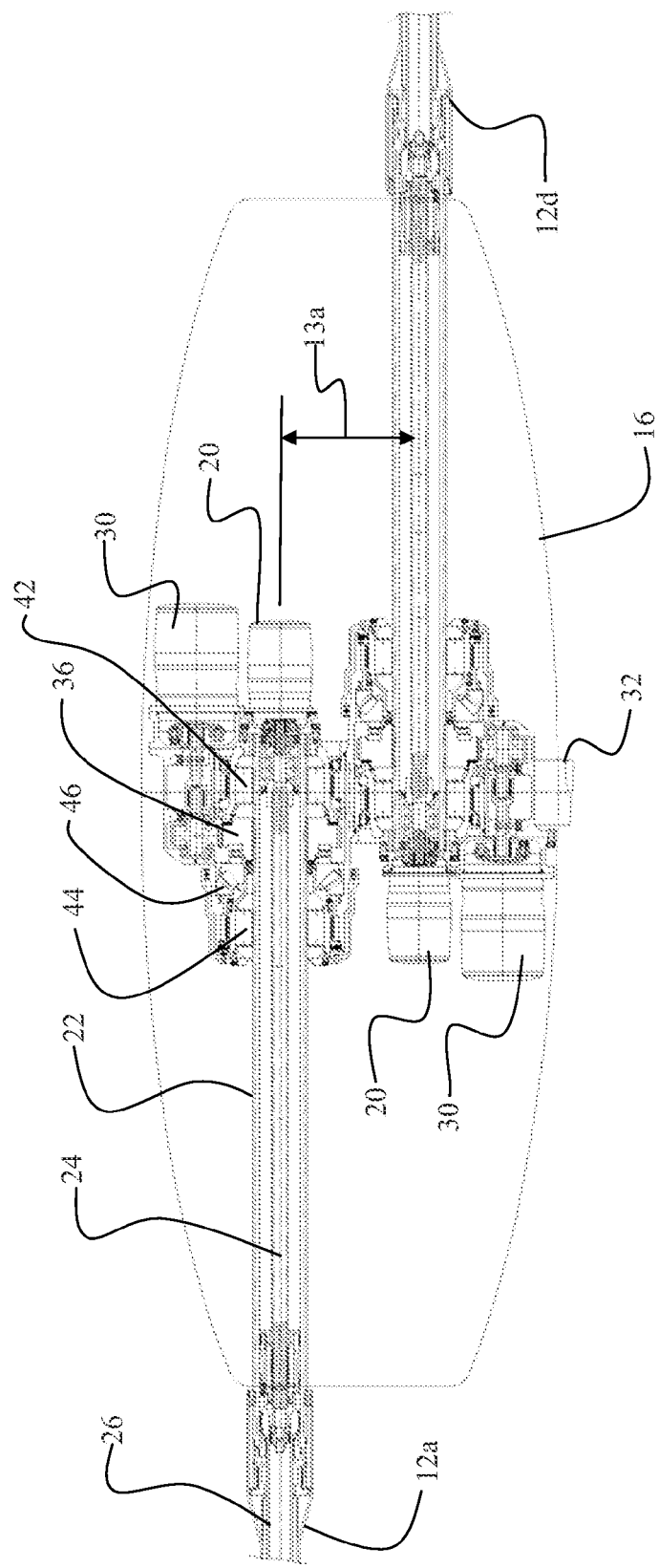
FIG. 2B is a front section view of the disc rotor system with one of each blade pair eliminated for clarity and the remaining lower blade shifted 90°.

As shown in FIGS. 2A and 2B, for each blade 12a, 12b, 12c and 12d, the geared electric actuator 20 is mounted onto the main blade spar 22 to rotate ball screw 24 to retract the blade tip and mid aero panels. The ball screw 24 telescopes into titanium intermediate spar 26 during retraction. As previously described, the ball screw works in tandem with an accumulator powered hydraulic system that combines to push the tip and mid aero panels of the blade in, augmenting the ball screw, as will be described in greater detail subsequently with respect to FIGS. 5A and 5B.

Figure 3A:
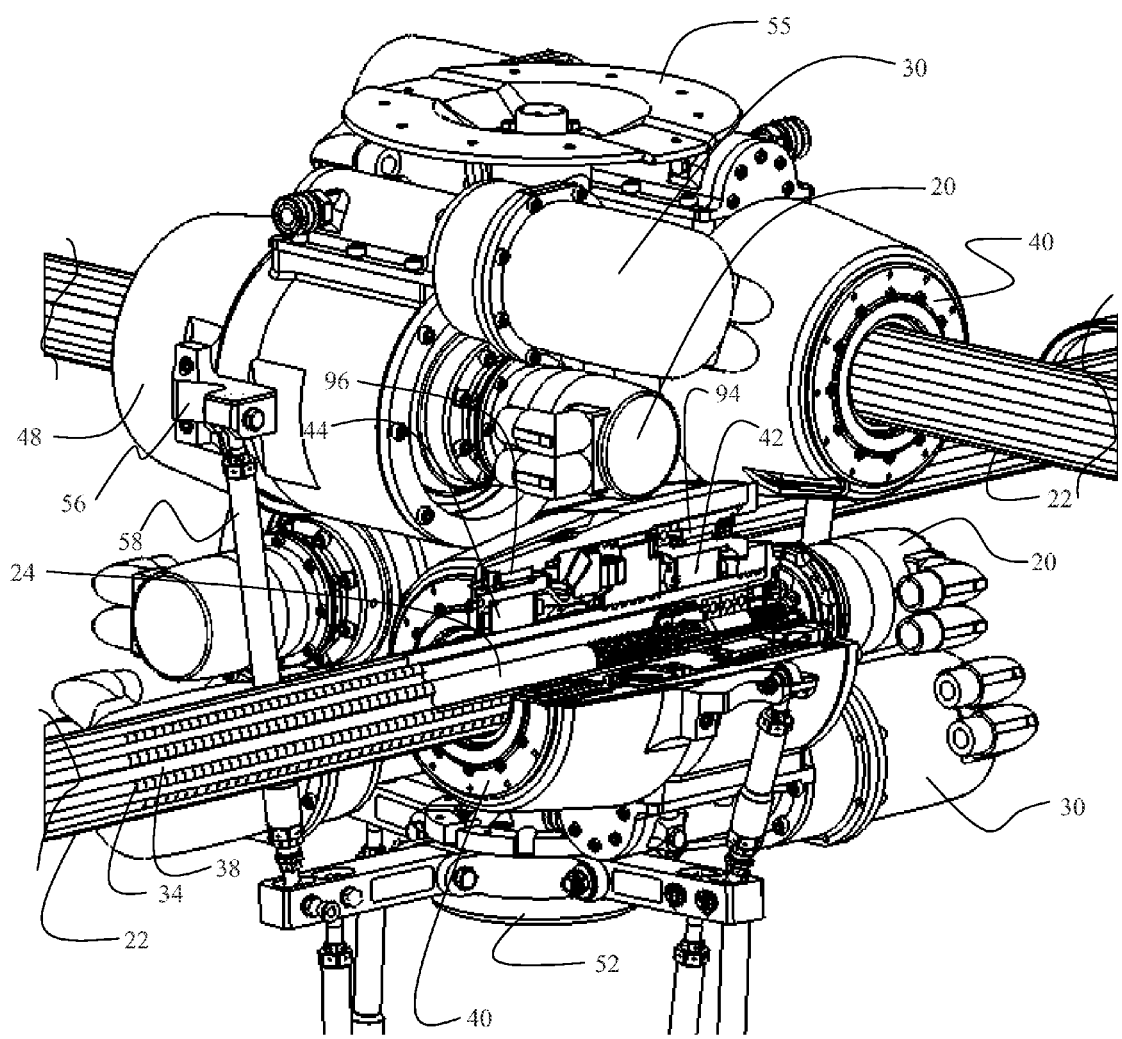
FIG. 3A is an isometric partially sectioned view of the actuation components of the disc rotor.
Figure 3B:
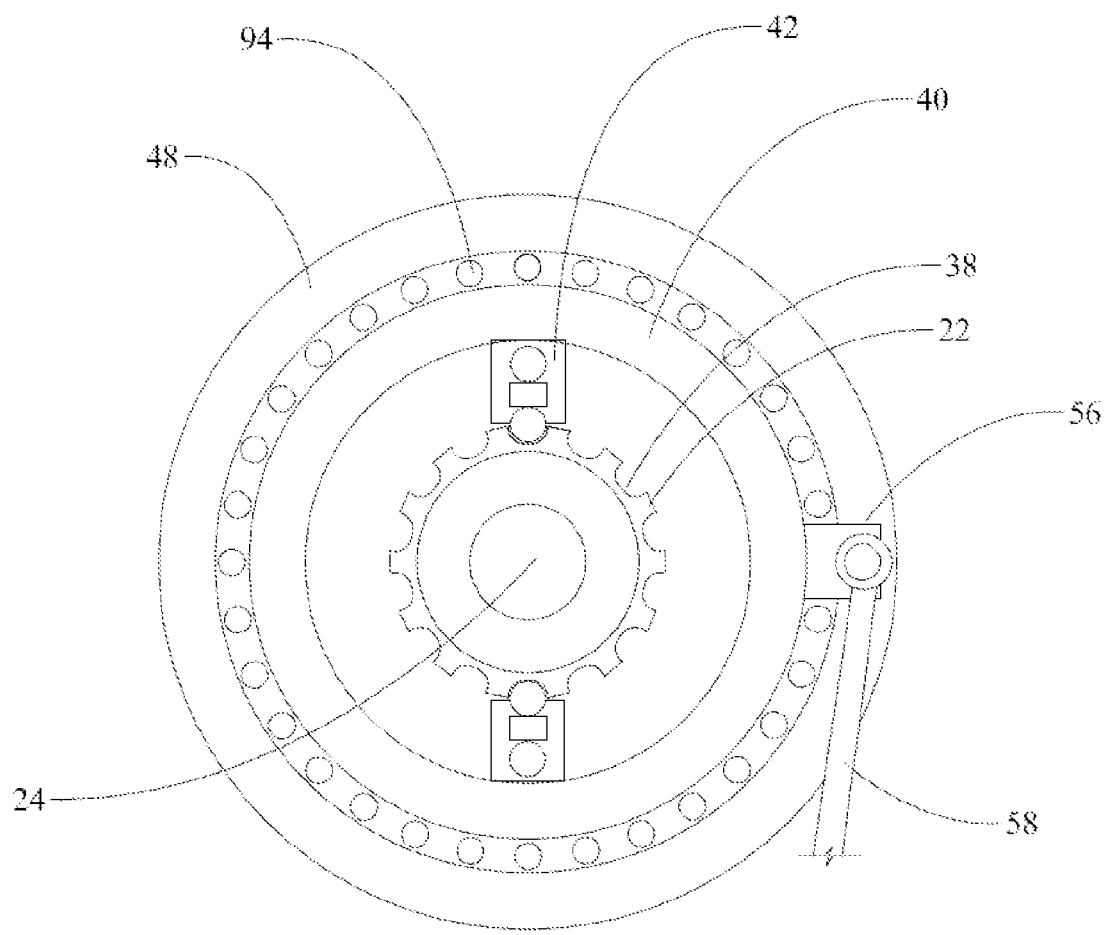
FIG. 3B is a schematic sectioned end view of the ball spline, ball sleeve.

As shown in FIGS. 2B, 3A and 3B the second retraction stage for each blade 12a, 12b, 12c and 12d, is powered by the second geared electric actuator 30 mounted onto a rotor hub 32, the details of which will be described with respect to FIG. 4. As previously described, the second retraction stage operates with ACME screw thread 34 machined onto the main spar 22. ACME nut 36 (having an external bull gear 37 shown and described in greater detail with respect to FIG. 8 subsequently) engages the screw thread 34 for retraction and retention of main blade spar 22 and attached root aero panel 14a.

As seen in FIGS. 3A and 3B, grooves of a ball spline 38 extend longitudinally on the main blade spar 22 providing a second function of each main blade spar 22 for pitch control of the respective blade 12a, 12b, 12c, or 12d. A ball sleeve assembly 40 engages the ball spline 38 with inner ball sleeve 42 and outer ball sleeve 44 and serves to transfer blade loads from the main blade spar into pitch bearings 94 and 96 that fit around the outer diameter of sleeve assembly 40. For each blade, a blade pitch arm 56 is connected to a pitch link 58 on the ball sleeve assembly 40 that is rotatable within roller pitch bearings 94 and 96 and centrifugal retention bearing 46 having rollers 47. This enables pitch control at any retraction position using the ball spline 38 engagement on main blade spar 22 with the ball sleeves 42, 44 in the ball sleeve assembly 40 rotating in pitch bearings 94 and 96 and retention bearing 46.

Figure 4:
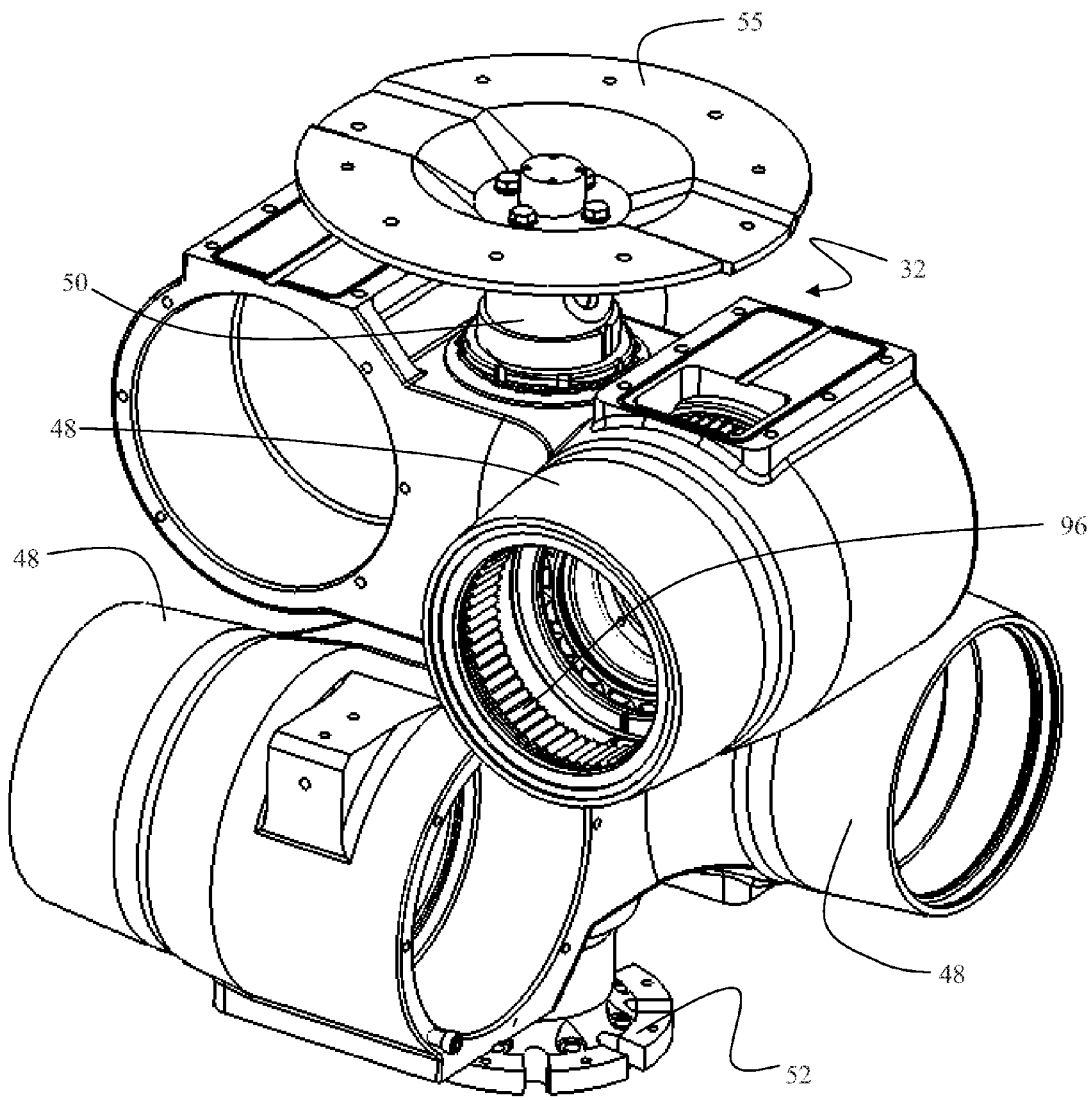
FIG. 4 is an isometric view of a rotor hub for the embodiment of FIG. 1.

For each blade, the main blade spar 22 and associated ball sleeve assembly 40, pitch bearings 94 and 96 are mounted in a respective hub collar 18 in the hub 32 shown in FIG. 4. Hub collars 48 are carried by rotor shaft 50 which is connected through a flange interface 52, at a bottom end, to power train 53 (shown in FIG. 1). Rotor shaft 50 also provides a disc fairing attachment bracket 55 at a top end.

Figure 5A:
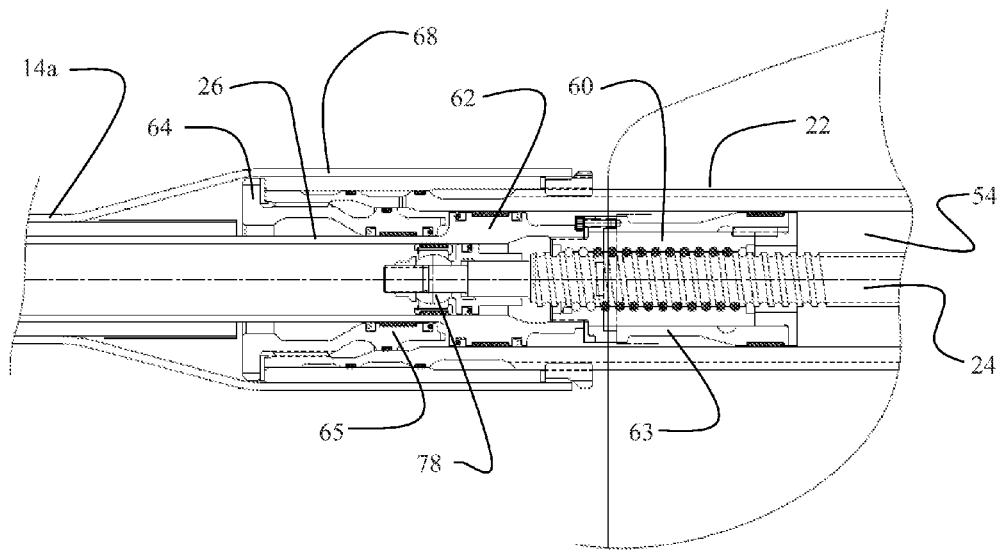
FIG. 5A is a detailed front section view of the combined ball screw actuating system and hydraulic piston and cylinder of a first stage retraction system for the mid and outer aero panels in the extended position.
Figure 5B:
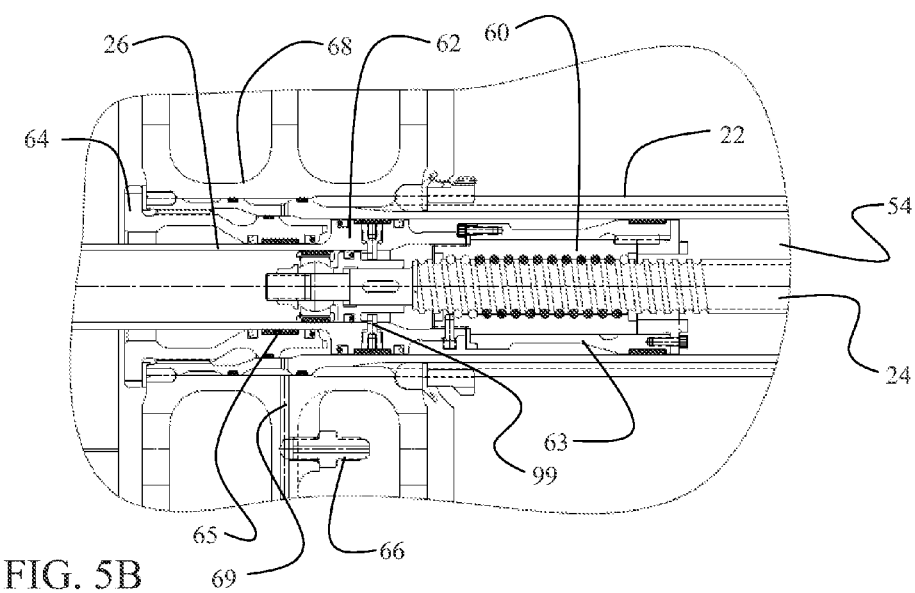
FIG. 5B is a detailed top section view of the first stage retraction system of FIG. 5A.
Figure 6A:
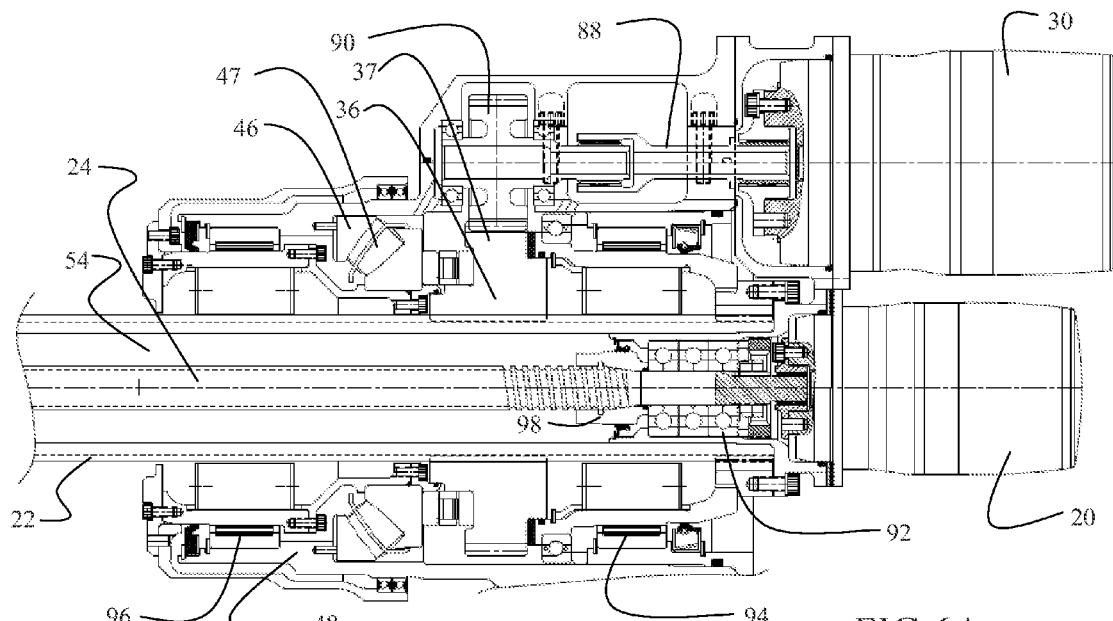
FIG. 6A is a detailed front view of the drive actuator for the ball screw system of the first stage retraction system and a second stage retraction system.
Figure 6B:
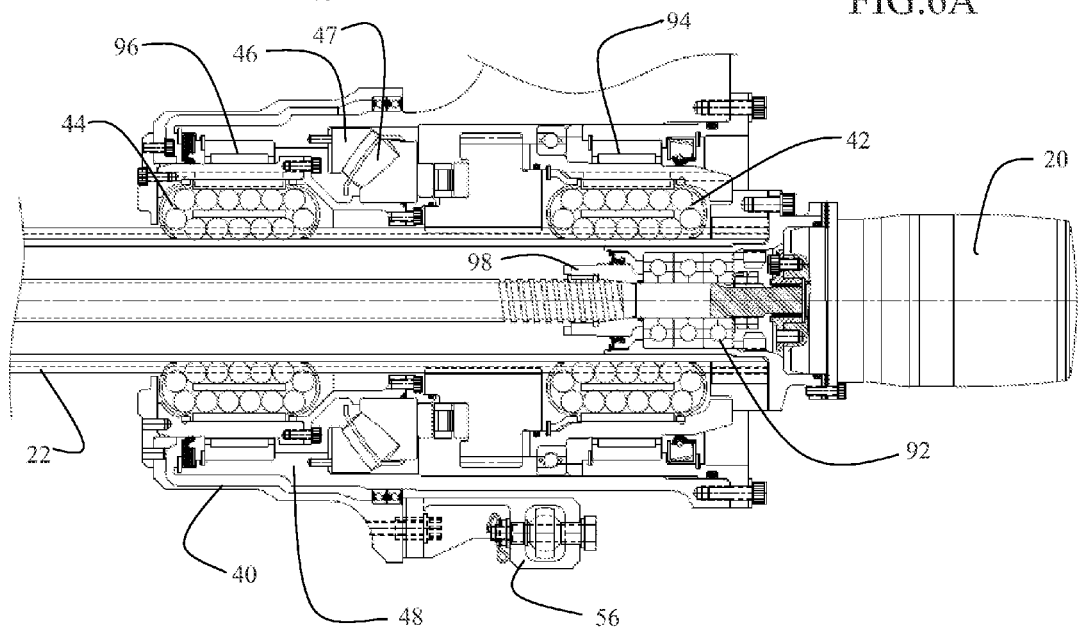
FIG. 6B is a detailed top view of the elements of the first and second stage retractions systems of FIG. 6A.
Figure 7:
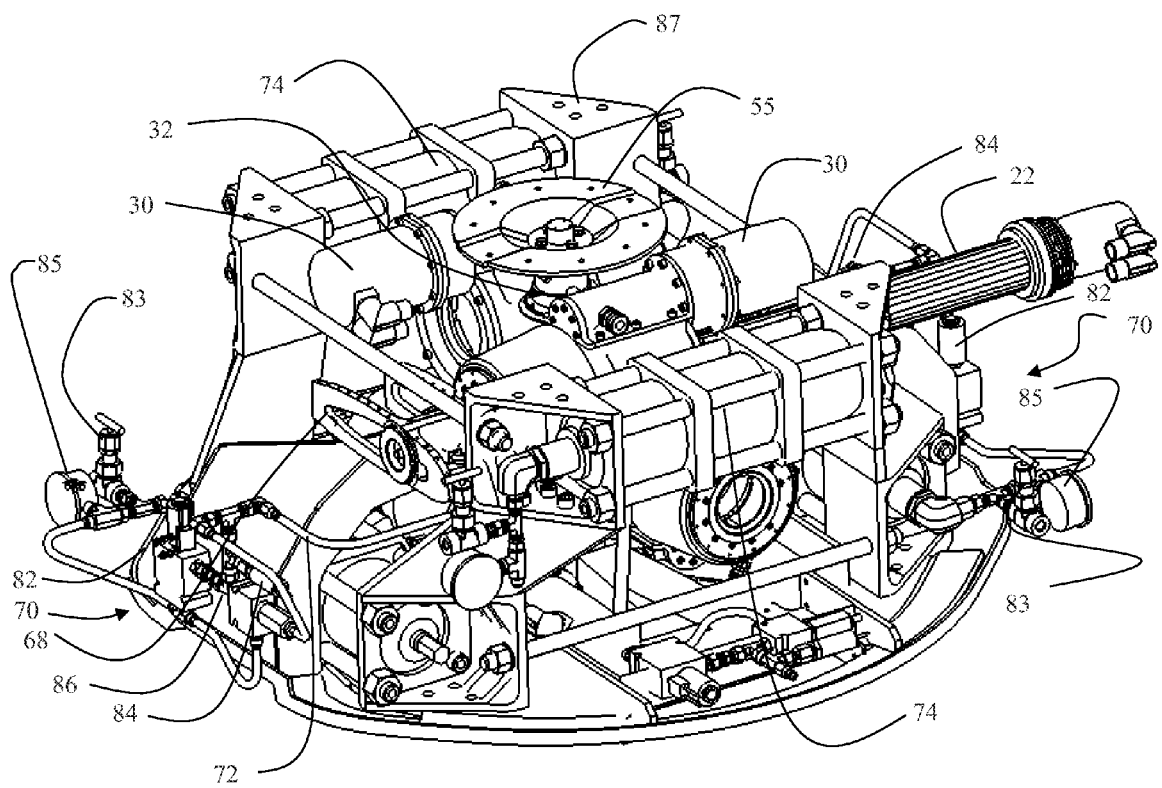
FIG. 7 is an isometric view of the combined actuation systems with rotor blade elements removed for clarity.

As shown in detail in FIGS. 5A and 5B at the tip and FIGS. 6A and 6B at the root, the main blade spar 22 is a multi function component. In addition to providing a threaded retraction ACME screw 34 and a spline 38 on its outside surface, a chamber created by the internal diameter of the spar serves as a hydraulic cylinder 54 for the first stage retraction system. As shown in FIGS. 5A and 58 with the blades in the fully extended position, ball nut 60 rides on ball screw 24 and is attached to a piston head 62, which extends from the inboard end of intermediate spar 26, with a housing 63 using mating bolted flanges. A hydraulic cylinder head 61 inserted in the end of main blade spar 22 caps the hydraulic cylinder 54 and provides a hydraulic seal 65 through which intermediate spar 26 is received. Hydraulic fluid introduced through port 66, which for the embodiment shown is attached through a root forging 68 of the root aero panel 14a, flows into the hydraulic cylinder between the cylinder head 64 and piston head 62 through conduit 69. As best seen in FIG. 7, hydraulic fluid for each hydraulic cylinder is controlled through a valve manifold 70 connected to the port 66 through a flex line 72. An accumulator 74 connected to the manifold 70 stores hydraulic fluid at operating pressure.

Returning to FIGS. 5A and 5B, for retraction of the tip and mid aero panels, geared motor actuator 20 turns the ball screw 24 and the associated ball nut 60 attached to the hydraulic piston head 62 withdraws into the hydraulic cylinder. Pressurized hydraulic fluid is expelled from the accumulator during blade retraction urging the piston head from the outboard to inboard end of the hydraulic cylinder. Alignment of the ball screw at an outboard end is provided by self-aligning steady rest slider bearing 78 which rides on an inner circumference of intermediate spar 26 which is telescopically received, over the ball screw and within the main blade spar. During blade extension, blade centrifugal force and power of the geared actuator 20 driving the ball screw 24 for extension of the ball nut 60 and attached piston head 62 are used to recharge the accumulator 74 with the piston head driving hydraulic fluid back through conduit 69, flex line 72 and manifold 70.

Figure 9:
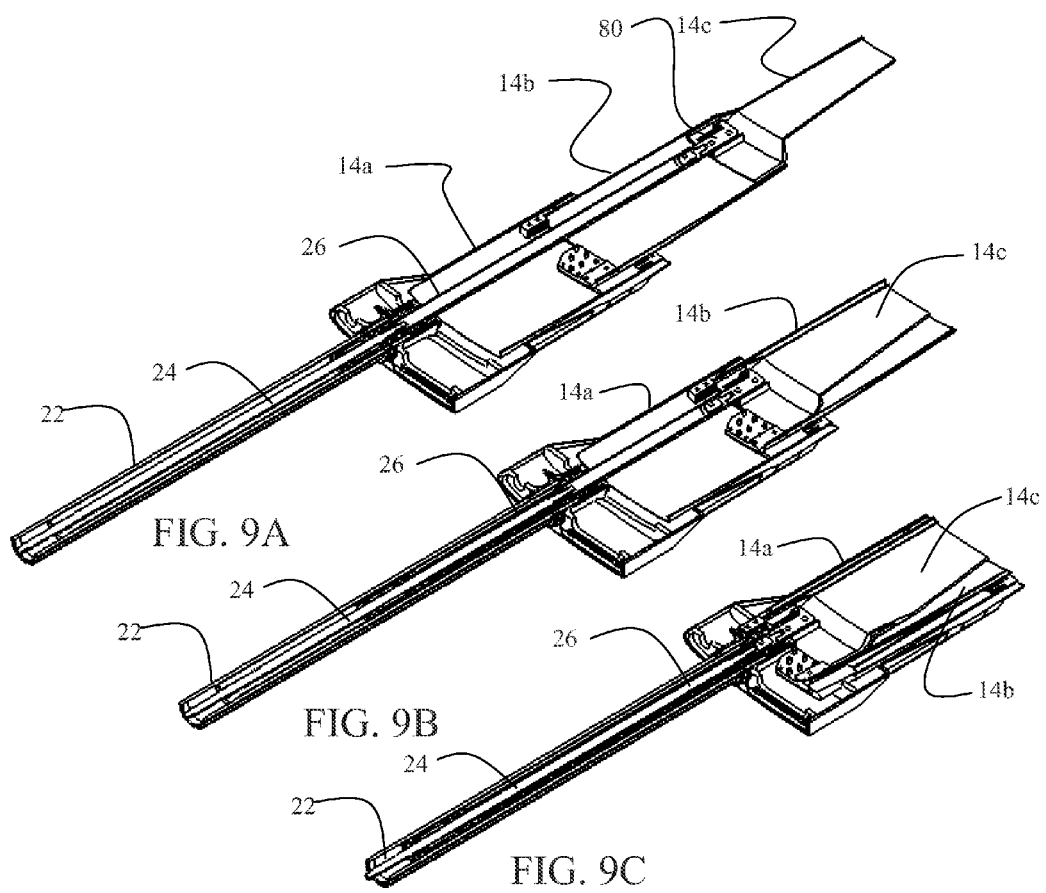
FIGS. 9A, 9B and 9C are isometric section views showing the outer and mid aero panels in the fully extended, partially retraced and fully retracted positions.

From the extended position show in FIG. 9A, the first retraction stage isolates the centrifugal load by, at first, retracting only the blade tip aero panel 14c, which is attached to an outboard fitting 80 on intermediate spar 26, telescopically into the blade mid aero panel 14b as shown in FIG. 9B. This is followed, by retracting the collapsed blade tip aero panel 14c and mid aero panel 14b into root aero panel 14a as shown in FIG. 9C when the blade radius has been reduced and the tip loads are lower.

As shown in FIG. 7, manifold 70 incorporates a solenoid valve 82, a hydraulic check valve 84 for one way flow into the hydraulic cylinder, and a pressure relief valve 86 for cross flow in the hydraulic system to provide a means to recharge the accumulator. Each manifold includes a fill cock 83 and a pressure gage 85 for initial and maintenance filling of the accumulators. With the solenoid valve 82 set for flow through the check valve 84, the check valve 84 acts as a brake and prevents the ball-screw from being back-driven by centrifugal force in the event of an electric actuator failure. The pressure relief valve 86 allows centrifugal force and actuator power to generate enough pressure to overcome the pressure setting and recharge the accumulator. In addition to the hydraulic brake, the electric geared actuator 20 for each blade in the example embodiment incorporates an integral motor brake that serves as a backup for the hydraulic brake in the event of a hydraulic system failure. For the exemplary embodiment shown in the drawings, sized for a windtunnel model, a geared actuator by Wittenstein Motion Control, part number TPM-004S-021M-5PB1-053B-W1 is employed for a 320 volt actuator with 21/1 gear ratio and including an encoder, a temperature sensor and a brake. For the embodiment shown in the drawings, the accumulators 74, hydraulic manifolds 70 and associated components are supported by a structural tray 87 mounted to the hub 32 within the disc fairing 16.

Figure 8:
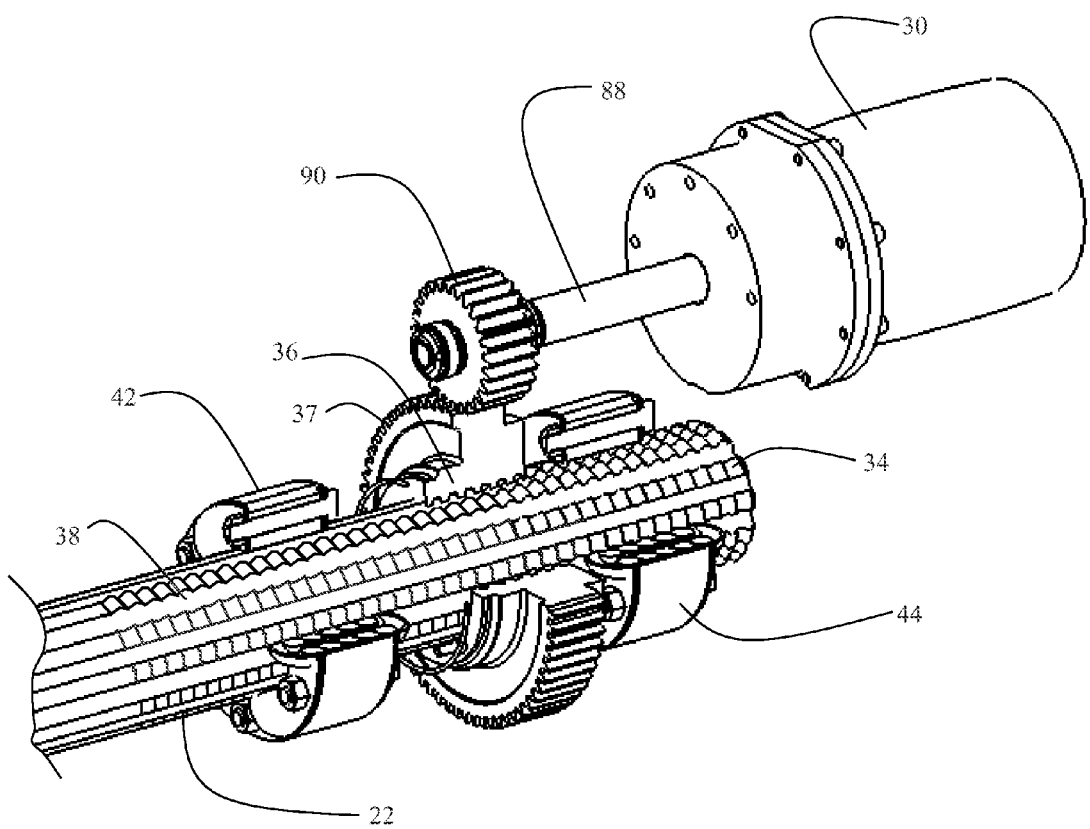
FIG. 8 is a detailed partial section view of the actuating elements of the second stage retraction system.
Figure 10:
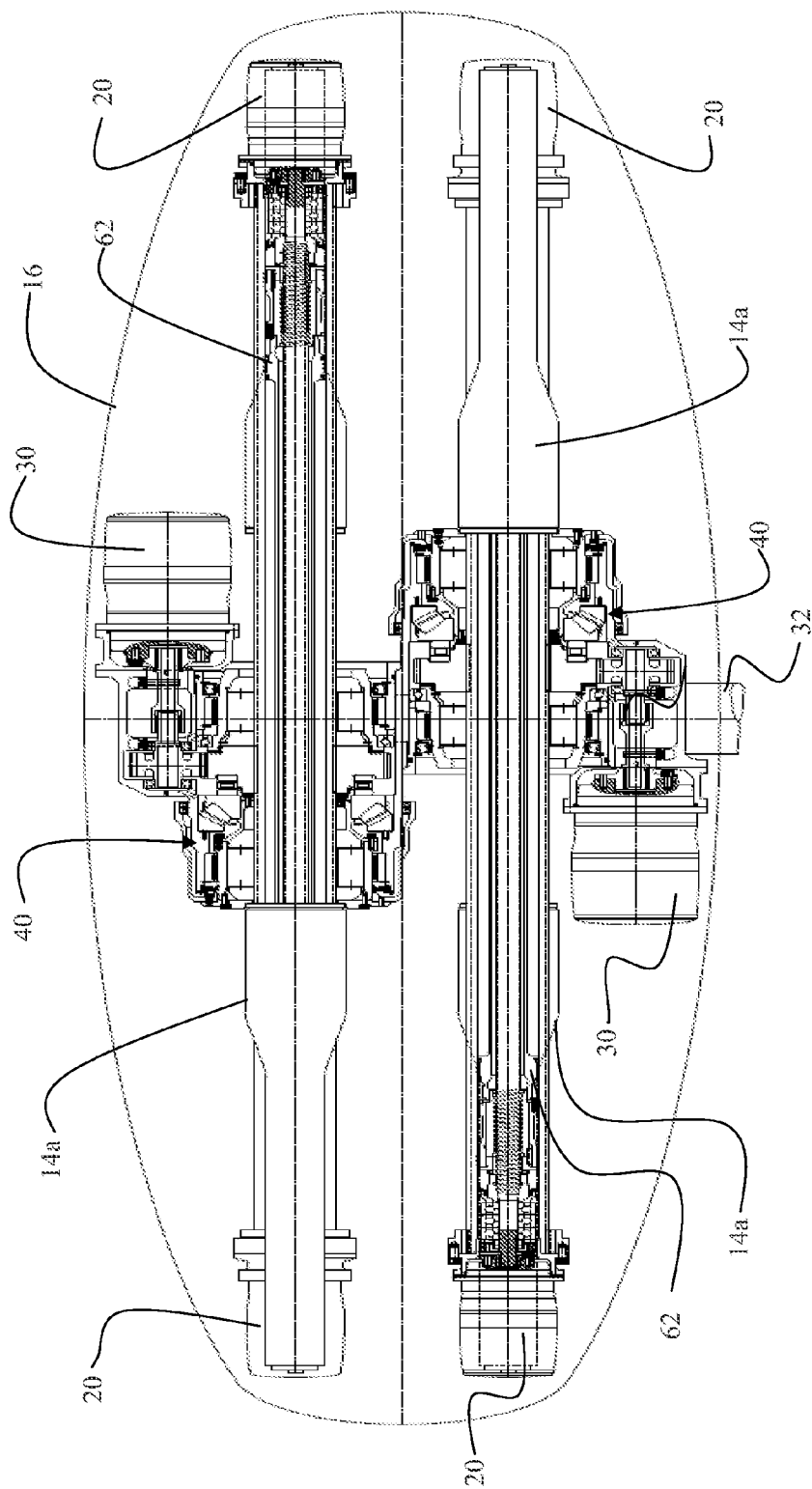
FIG. 10 is a front view of the disc with the rotors folly retracted.

During the second retraction stage, for each blade second geared actuator 30 provides rotational power through a shaft 88 to a pinion gear 90, as best seen in FIGS. 6A and 8, which drives bull gear 37 on ACME nut 36 engaging ACME screw threads 34 (shown for only a portion of the spar length to allow clear display of the grooves of spline 38 engaged by ball sleeve 42) and the main blade spar 22 retracts through the ball sleeve assembly 40 and hub collar 48 in the opposite direction of the blade as shown in FIG. 10. In addition to retracting the root aero panel 14a with the nested tip and mid aero panels, 14c, 14b, into the disc 16 this configuration counter balances the blade during the second stage of retraction. In an alternative embodiment for the second stage retraction system the ACME-screw is replaced with a more efficient ball-screw that can function in combination with the ball-spline in a fashion similar to the first stage ball-screw. At the completion of the second stage retraction, an integral motor brake in the second geared actuator 30 is applied to assist in holding the blade in the retracted position.

Figure 11:
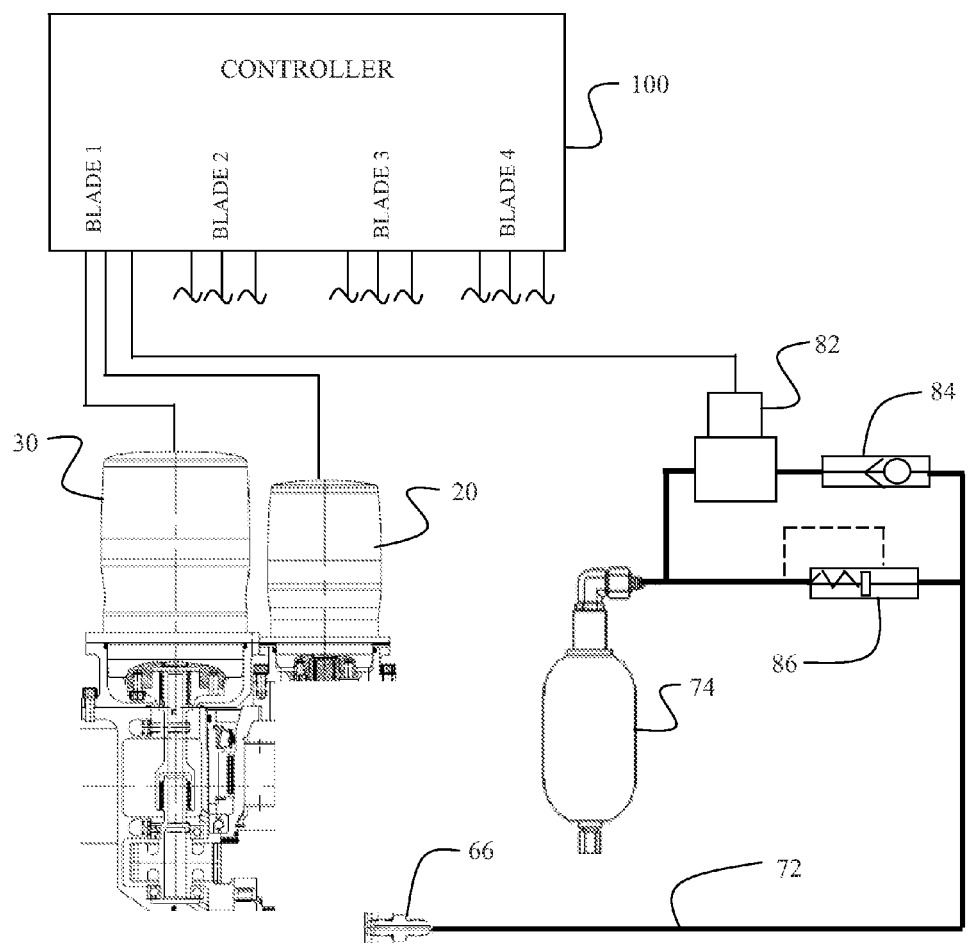
FIG. 11 is a schematic diagram of the control elements of the retraction system; and, FIGS. 12A and 12B are a flow chart of functional operation of the first and second stage retraction systems.

For the example embodiment disclosed herein, spar 22 is a laminated structure of metal and carbon fiber composite. An outer shell of the spar is metal and provides both the grooves for the ball-spline 38 and the threads 34 for an interrupted ACME screw. The ACME screw 34 inherently has too much friction to be back-driven under load. In the event of an electric actuator failure, a motor brake engages and the ACME screw serves as a friction break to hold the blade in its last position. As shown in FIG. 11, an electronic controller 100 provides power to the geared actuators 20, 30 for all blades and can sense an actuator failure using sensor inputs from integral temperature sensors and encoders (or other sensors in alternative embodiments) indicating excessive temperatures or differences between commanded position and actual encoder position. Controller 100 can command all remaining actuators to hold position with a failed unit at a calculated encoder position to prevent any rotor imbalance. Controller 100 additionally controls solenoid valve 82 for directional flow control of the hydraulic fluid through check valve 84.

Returning to FIGS. 5A, 5B, 6A and 6B, the present embodiment employs an inner ball screw and blade retention bearing assembly 92 (best seen in FIGS. 6A and 6B) carried in an inner end of the main blade spar 22 which also provides the inner seal for the hydraulic cylinder. Additionally, rotational support by bearing 46 for the ball sleeve assembly 40 is supplemented by inner and outer blade pitch roller hearings 94, 96. A retraction torque stop collar 98 (seen in FIGS. 6A and 6B) prevents over rotation of the ball screw during retraction while an extension torque stop collar 99 (seen in FIGS. 5A and 5B) prevents over rotation of the ball screw during extension of the blades.

Figure 12A:
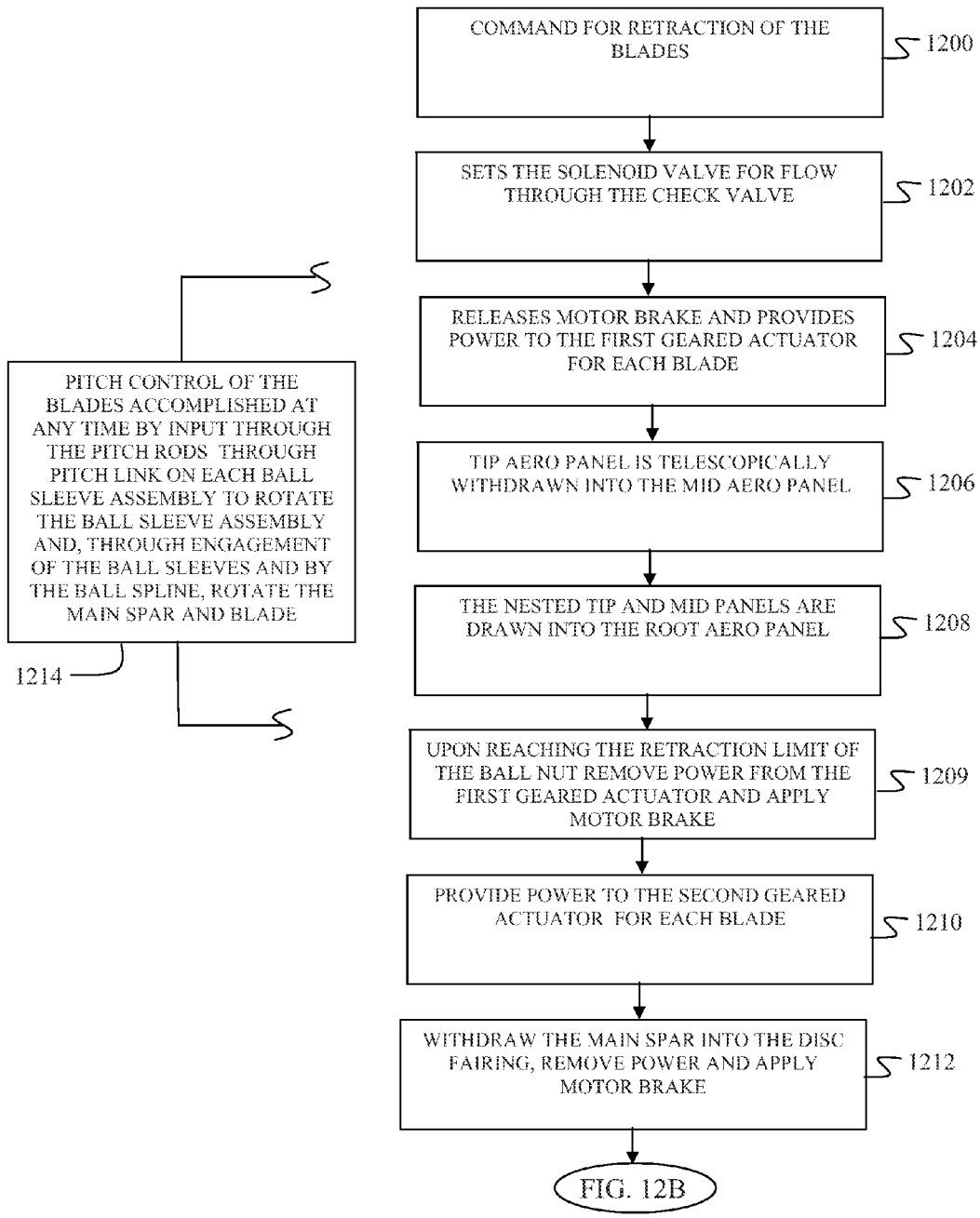

As represented in FIG. 12A, operation of the disc rotor retraction system is conducted by the controller 100, which upon command for retraction of the blades, step 1200, by the vehicle pilot (or automated command system for unmanned vehicles), sets the solenoid valve 82 in manifold assembly 70 for flow through the check valve 84, step 1202, allowing hydraulic fluid to flow from the accumulator and provides power, step 1204, to the first geared actuator 20 for each blade. As previously described with respect to FIGS. 9A, 9B and 9C, upon rotation of the ball screw 24 responsive to the geared actuator 20, and with the assistance of pressurized hydraulic fluid from accumulator 74 acting on the piston head 62, the tip aero panel 14c is telescopically withdrawn into the mid aero panel 14b, step 1206. The nested tip and mid panels are then drawn into the root aero panel 14a, step 1208 and upon reaching the retraction limit of the ball nut 60, the controller removes power from the geared actuator(s) 20 and applies a motor brake, step 1209. The controller then provides power, step 1210, to the second geared actuator 30 for each blade. Rotation of the second geared actuator 30, shaft 88, pinion gear 90 and bull gear 37/ACME nut 36 results in withdrawing the main blade spar 22 by the ACME thread 34 through the ball sleeves 42, 44 of the ball sleeve assembly 40, step 1212, into the disc fairing 16. Pitch control of the blades may be accomplished at any time by input through the pitch arms 56 through pitch link 58 on each ball sleeve assembly 40 to rotate the ball sleeve assembly and, through engagement of the ball sleeves 42 and 44 by the ball spline 38, rotate the main blade spar and blade, step 1214. During the second stage of retraction into the disc, blade pitch must be held constant. Blade pitch must be held constant to prevent actuator 30 from being backdriven during the retraction process and to maintain blade clearance while entering the disc fairing 16. At completion of the second retraction stage, the motor brake is applied.

Continuing with FIG. 12B the extension of the blades, upon command, step 1216, controller 100 releases the motor brake and provides power to the second geared actuator 30 for each blade, step 1217. Counter rotation of the second geared actuator 30, shaft 88, pinion gear 90 and bull gear 37/ACME nut 36 results in extension of the main blade spar 22 by the ACME thread 34 through the ball sleeves 42, 44 of the ball sleeve assembly 40, step 1218 to extend the root aero panel from the disc fairing 16. Upon fall extension of the root aero panel, controller 100 positions solenoid valve 82 for flow of hydraulic fluid through the pressure relief valve 86, step 1220, releases the motor brake and provides power to the second gear actuator, step 1222, for each blade. Upon counter rotation of the ball screw 26 responsive to the geared actuator 20, the nested tip and mid panels are extended from the root aero panel 14*a*, step 1224, and the tip aero panel 14*a* is telescopically extended from the mid aero panel 14*b*, step 1226, with centrifugal force and power from the geared actuator pressurizing the hydraulic fluid for flow into the accumulator 74, step 1227. Upon reaching the extension limit of the ball nut 60, the blades are fully extended and the controller removes power from the geared actuator(s) 20, step 1228 and applies a motor brake.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A disc rotor blade retraction system comprising:
   a main blade spar incorporating a hydraulic cylinder and having a screw thread;
   a ball screw concentrically carried within the main blade spar and operably carrying a ball nut having an outboard end connected to an intermediate spar and a hydraulic piston received for reciprocation in the hydraulic cylinder;
   a first geared actuator operably engaging the ball screw;
   a second geared actuator operably engaging the main blade spar screw thread;
   a hydraulic fluid accumulator connected to an outboard end of the hydraulic cylinder; and,
   a controller for actuation of the first and second geared actuators.

2. The disc rotor blade retraction system as defined in claim 1 further comprising a pitch control assembly concentrically engaging the main blade spar.

3. The disc rotor blade retraction system as defined in claim 2 wherein the pitch control assembly includes a ball sleeve engaging grooves in a ball spline on the main blade spar.

4. The disc rotor blade retraction system as defined in claim 2 wherein the pitch control assembly is mounted for rotation in a collar carried by a rotor hub.

5. The disc rotor blade retraction system as defined in claim 1 wherein the intermediate spar supports at least one outer aero panel.

6. The disc rotor blade retraction system as defined in claim 5 wherein the intermediate spar is connected at an outboard end to a tip aero panel telescopically receivable in a mid aero panel upon retraction.

7. The disc rotor blade retraction system as defined in claim 6 wherein said mid aero panel is retractable into a root aero panel supported by the main blade spar, said root aero panel retractable into a disc fairing.

8. The disc rotor blade retraction system as defined in claim 1 further comprising a fluid manifold incorporating
   a check valve intermediate the accumulator and hydraulic cylinder;
   a pressure relief valve intermediate the accumulator and hydraulic cylinder; and
   a solenoid valve selectively connecting the pressure relief valve to the hydraulic cylinder, said solenoid valve responsive to the controller.

9. A disc rotor system comprising
   a plurality of rotor blades, each blade having a tip aero panel, a mid aero panel and a root aero panel, each blade having a retraction system supported by a rotor hub and incorporating
      a main blade spar carrying the root aero panel and incorporating a hydraulic cylinder, said main blade spar having a screw thread;
      a ball screw concentrically carried within the main blade spar operably carrying a ball nut having an outboard end connected to an intermediate spar carrying the mid aero panel and further connected to a hydraulic piston received for reciprocation in the hydraulic cylinder, said intermediate spar connected at an outboard end to the tip aero panel;
      a first geared actuator operably engaging the ball screw;
      a second geared actuator operably engaging the main blade spar screw thread;
      a hydraulic fluid accumulator connected to an outboard end of the hydraulic cylinder;
   a controller fir simultaneous actuation of the first and second geared actuators associated with each blade; and,
   a disc fairing supported by the rotor hub.

10. The disc rotor system as defined in claim 9 further comprising a pitch control assembly concentrically engaging the main blade spar.

11. The disc rotor system as defined in claim 10 wherein the pitch control assembly includes a ball sleeve engaging grooves in a ball spline on the main blade spar.

12. The disc rotor system as defined in claim 10 wherein the pitch control assembly is mounted for rotation in a collar carried by the rotor hub.

13. The disc rotor system as defined in claim 9 wherein the tip aero panel is telescopically receivable in the mid aero panel upon retraction.

14. The disc rotor system as defined in claim 13 wherein said mid aero panel is retractable into the root aero panel, said root aero panel retractable into the disc fairing.

15. The disc rotor system as defined in claim 9 wherein the retraction system for each blade further comprises a fluid manifold incorporating
   a check valve intermediate the accumulator and hydraulic cylinder;
   a pressure relief valve intermediate the accumulator and hydraulic cylinder; and
   a solenoid valve for selectively connecting the pressure relief valve to the hydraulic cylinder, said solenoid valve responsive to the controller.

16. The disc rotor system as defined in claim 15 wherein the accumulator and fluid manifold for each blade retraction system is mounted on a structural tray mounted to the hub within the disc fairing.

17. A method for operation of a disc rotor blade comprising:
   commanding retraction of a plurality of blades;
   for each blade,
      setting a solenoid valve for flow through a check valve for hydraulic fluid to flow from an accumulator;
      providing power to a first geared actuator;
      rotating a ball screw responsive to the geared actuator and with the assistance of pressurized hydraulic fluid from the accumulator acting on a piston head, telescopically withdrawing a tip aero panel connected to a ball nut into a mid aero panel;
withdrawing the nested tip and mid aero panels into a root aero panel;
upon reaching a retraction limit of the ball nut on the ball screw, removing power from the geared actuator;
providing power to a second geared actuator for each blade; and,
rotating a nut with the second geared actuator, said nut acting on a thread on a main blade spar carrying the root aero panel to withdraw the main blade spar into a disc fairing.

18. The method of claim 17 wherein the main blade spar includes a grooved spline and the step of rotating a nut further comprises:
withdrawing the main blade spar through a ball sleeve assembly;
controlling pitch on each blade by input through pitch arms connected to each ball sleeve assembly to rotate the ball sleeve assembly and, through engagement of the ball sleeve assembly by the ball spline, rotate the main blade spar and blade.

19. The method of claim 17 further comprising:
commanding extension of the blades;
for each blade,
providing power to the second geared actuator for counter rotation of the nut;
extending the main blade spar by the thread to extend the root aero panel from the disc fairing;
upon full extension of the root aero panel, positioning the solenoid valve for flow of hydraulic fluid through the regulator;
providing power to the first gear actuator for counter rotation of the ball screw;
extending the nested tip and mid panels from the root aero panel;
by centrifugal force and power from the cleared actuator, pressurizing the hydraulic fluid for flow into the accumulator;
upon reaching the extension limit of the ball nut, removing power from the first geared actuator.

20. The method of claim 17 further comprising applying a motor brake upon removing power front the geared actuator.

\* \* \* \* \*